(12) United States Patent
Wang

(10) Patent No.: US 6,308,421 B1
(45) Date of Patent: Oct. 30, 2001

(54) MULTI-USE SCISSORS

(76) Inventor: Kuang-Pin Wang, No. 425, Ta-Tun 4 Street, Taichung (TW)

( * ) Notice: Subject to any disclaimer, the term of this patent is extended or adjusted under 35 U.S.C. 154(b) by 0 days.

(21) Appl. No.: 09/541,077

(22) Filed: Mar. 31, 2000

(51) Int. Cl.[7] .............................. B26B 17/00; B26B 29/00
(52) U.S. Cl. ................................. 30/178; 30/179; 30/229; 30/233; 30/293
(58) Field of Search .............................. 30/123, 131, 178, 30/179, 229, 231, 233, 289, 293

(56) References Cited

U.S. PATENT DOCUMENTS

| | | | | |
|---|---|---|---|---|
| 4,106,195 | * | 8/1978 | Berg | 30/233 |
| 5,542,182 | * | 8/1996 | Martinez | 30/179 |
| 5,673,487 | * | 10/1997 | Malagonoux | 30/179 |
| 5,913,575 | * | 6/1999 | Lai | 30/229 |
| 6,145,203 | * | 11/2000 | Appleman | 30/233 |

\* cited by examiner

*Primary Examiner*—Hwei-Slu Payer
(74) *Attorney, Agent, or Firm*—Rosenberg, Klein & Lee

(57) ABSTRACT

A multi-use scissors composed of a first grip, a second grip and a blade bar which are pivotally connected with each other. A link is additionally pivotally connected between the second grip and the blade bar to form a double lever aspect. A multi-use blade sheath unit is fitted with the front end of the first grip. The top and bottom faces of the blade sheath unit are respectively formed with two kinds of blade sheaths for cutting different types of work pieces.

5 Claims, 8 Drawing Sheets

US 6,308,421 B1

MULTI-USE SCISSORS

BACKGROUND OF THE INVENTION

The present invention relates to a multi-use scissors which can be conveniently used with less strength. Different blade sheaths can be quickly replaced for cutting, different types of work pieces.

FIGS. 8 and 9 show a conventional multi-use scissors composed of a first grip 91 and a second grip 92 which are pivotally connected with each other. The front end of the first grip 91 is formed with a clamp section 93. The front end of the second grip 92 is formed with a blade section 94. Different types of blade sheaths 95, 97 can be fitted with the clamp section 93. A fixing, pin 96 is passed through the clamp section 93 and the blade sheath 95, 97 for fixing, the same. The blade sheath 95 is in a form of blade channel formed with a notch 951, while the blade sheath 97 has a form of cutting board.

Such multi-use scissors is mostly used to scissor a tubular article, plate-like article or carpet. It is laborious to scissor these articles with the multi-use scissors.. Moreover, the different types of blade sheaths 95, 97 must be respectively stored and used so that the blade sheaths 95, 97 tend to miss.

SUMMARY OF THE INVENTION

It is therefore a primary object of the present invention to provide a multi-use scissors in which the distance between the pivot section connecting the blade bar with the first grip and the pivot section connecting the blade bar with the link is larger than the distance between the pivot section connecting the second grip with the first grip and the pivot section connecting the second grip with the link. Accordingly, the tightly holding force exerted onto the first and second grips by a user will create double lever effect so as to save strength. The top and bottom faces of the blade sheath unit are integrally formed with two kinds of blade sheaths, whereby the blade bar can be co-used with the different blade sheaths to cut different configurations of work pieces.

According to the above object, the multi-use scissors of the present invention includes:

a first grip having a forward extending hollow clamp section at front end, a middle portion of the clamp section being formed with a fixing hole for a fixing pin to insert therein;

a second grip, a front end of the second grip being pivotally disposed on the middle section of the first grip;

a blade bar, a middle section of the blade bar being pivotally disposed on the middle section of the first grip between the first. and second grips, the front section of the blade bar being a blade section, a rear end of the blade bar being pivotally connected with a link, the other end of the link being pivotally disposed on the second grip near the pivot section connecting the second grip with the first grip, the distance between the pivot section connecting the blade bar with the first grip and the pivot section connecting the blade bar with the link being larger than the distance between the pivot section connecting the second grip with the first grip and the pivot section connecting the second grip with the link; and a blade sheath unit having a main body, two sides of a middle section of the main body being respectively formed with two receiving cavities complementary to the clamp section for the clamp section to fit therein, the main body being formed with a through hole corresponding to the fixing hole of the clamp section for the fixing pin to pass therethrough, a top and a bottom faces of the main body being respectively formed with a first and a second blade sheaths, the first and second blade sheaths being respectively formed with two shoulder sections on the top and bottom edges of the receiving cavities for the clamp section to lean against.

The present invention can be best understood through the following description and accompanying drawings wherein:

DETAILED DESCRIPTION OF THE PREFERRED EMBODIMENTS

Figure 1:
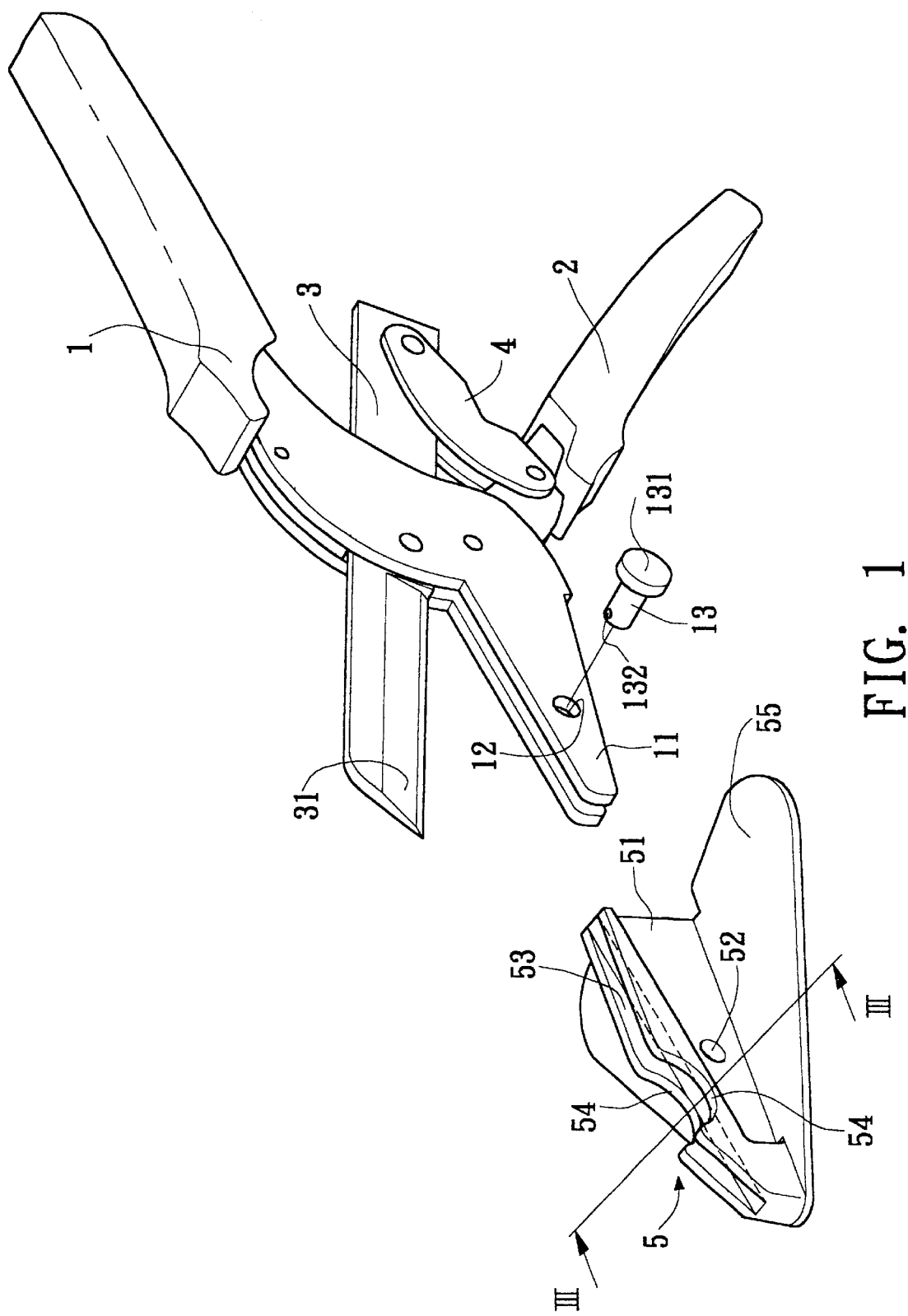
FIG. 1 is a perspective view of the present invent
Figure 2:
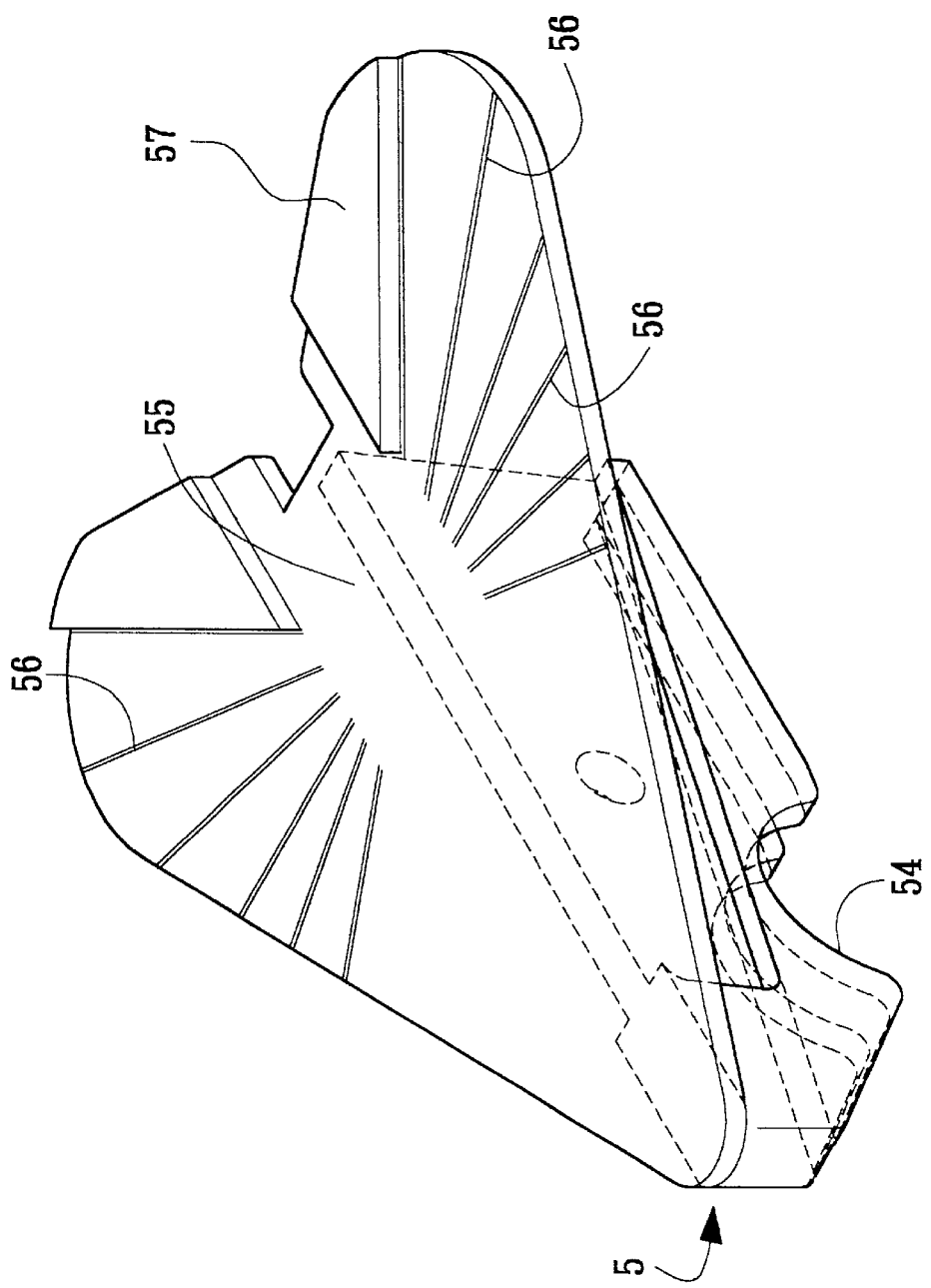
FIG. 2 is a perspective view of the blade sheath of the present invention.
Figure 3:
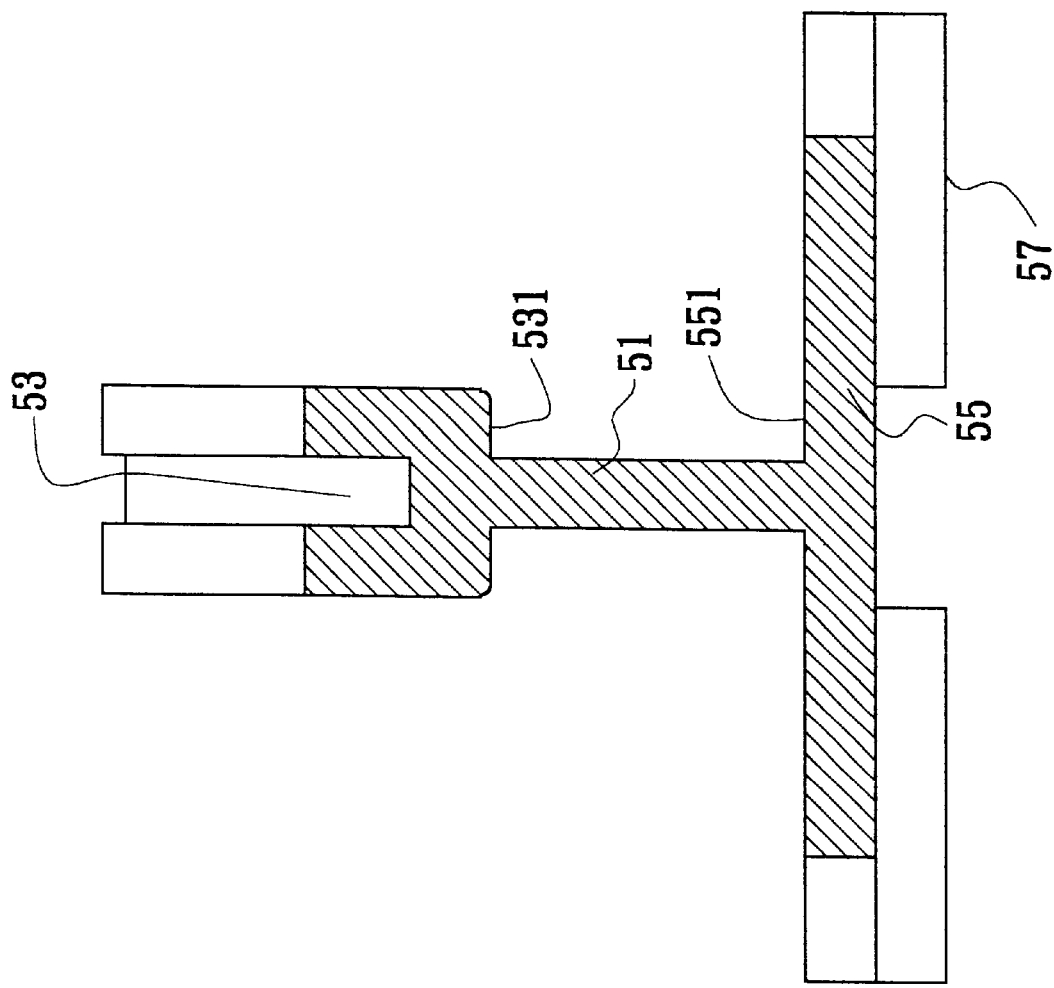
FIG. 3 is a sectional view taken along line III—III of Fig. 1.

Please refer to FIGS. 1 to 3. The multi-use scissors of the present invention includes:

a first grip 1 having a forward extending hollow clamp section 11 at front end, a middle port ion of the clamp sect ion 11 being formed, with a fixing hole 12 for a fixing pin 13 to insert therein, one end of the fixing pin 13 having a stop flange 131, the other end thereof having a steel ball 132 in which a spring is disposed;

a second grip 2, a front end of the second grip 2 being pivotally disposed on the middle section of the first grip 1;

a blade bar 3, a middle section of the blade bar 3 being pivotally disposed on the middle section of the first grip 1 between the first and second grips 1, 2, the front section of the blade bar 3 being a blade section 31, a rear end of the blade bar 3 being pivotally connected with a link 4, the other end of the link 4 being, pivotally disposed on the second grip 2 near the pivot section connecting the second grip 2 with the first grip 1, the distance between the pivot section connecting the blade bar 3 with the first grip 1 and the pivot section connecting the blade bar 3 with the link 4 is larger than the distance between the pivot section connecting the second grip 2 with the first grip 1 and the pivot section connecting the second grip 2 with the link 4; and a blade sheath unit main body 5, two sides of a middle section of the main body 5 being respectively formed with two receiving cavities 51 complementary to the clamp section 11 for the clamp section 11 to fit therein, the main body 5 being formed with a through hole 52 corresponding to the fixing hole 12 of the clamp section 11 for the fixing pin 13 to pass therethrough, a top face of the main body 5 being formed with a first blade sheath unit, the center, thereof being formed with a longitudinally extending blade channel 53 for receiving the blade section 31 of the blade bar 3 therein, two sides of the blade channel 53 being respectively formed with two transverse arch notches 54, the bottom face of the main body 5 having a second blade sheath unit including a horizontal cutting board 55, two sides of the cutting board 55 being marked with angle scales 56, the first and second blade sheaths being respectively formed with two shoulder sections 531, 551 on the top and bottom edges of the receiving cavities 51 for the top and bottom faces of the clamp section 11 to lean against. Furthermore, the rear edge of the angle scales 56 has a projecting section 57 against which a work piece to be scissored is leant.

The distance between the pivot section connecting the blade bar 3 with the first grip 1 and the pivot section connecting the. blade bar 3 with the link 4 is larger than the distance between the pivot section connecting the second grip 2 with the first grip 1 and the pivot section connecting the second grip 2 with the link 4, that is, the resisting arm of the blade bar 3 is larger than the resisting arm of the second grip 2. Accordingly, the tightly holding force exerted onto the first and second grips 1, 2 by a user will create double lever effect so as to save strength.

Figure 4:
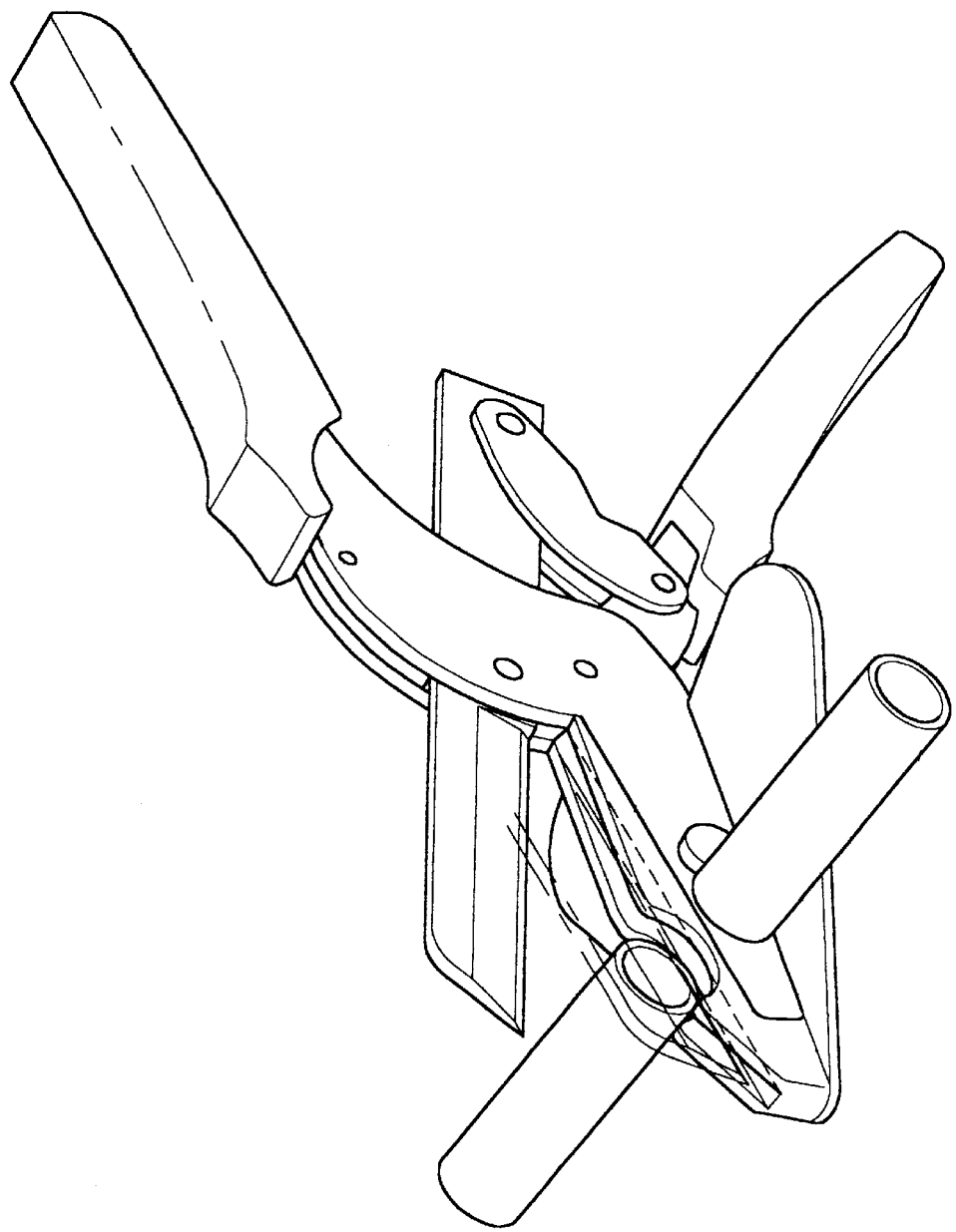
FIG. 4 shows the use of the present invention in one state.
Figure 5:
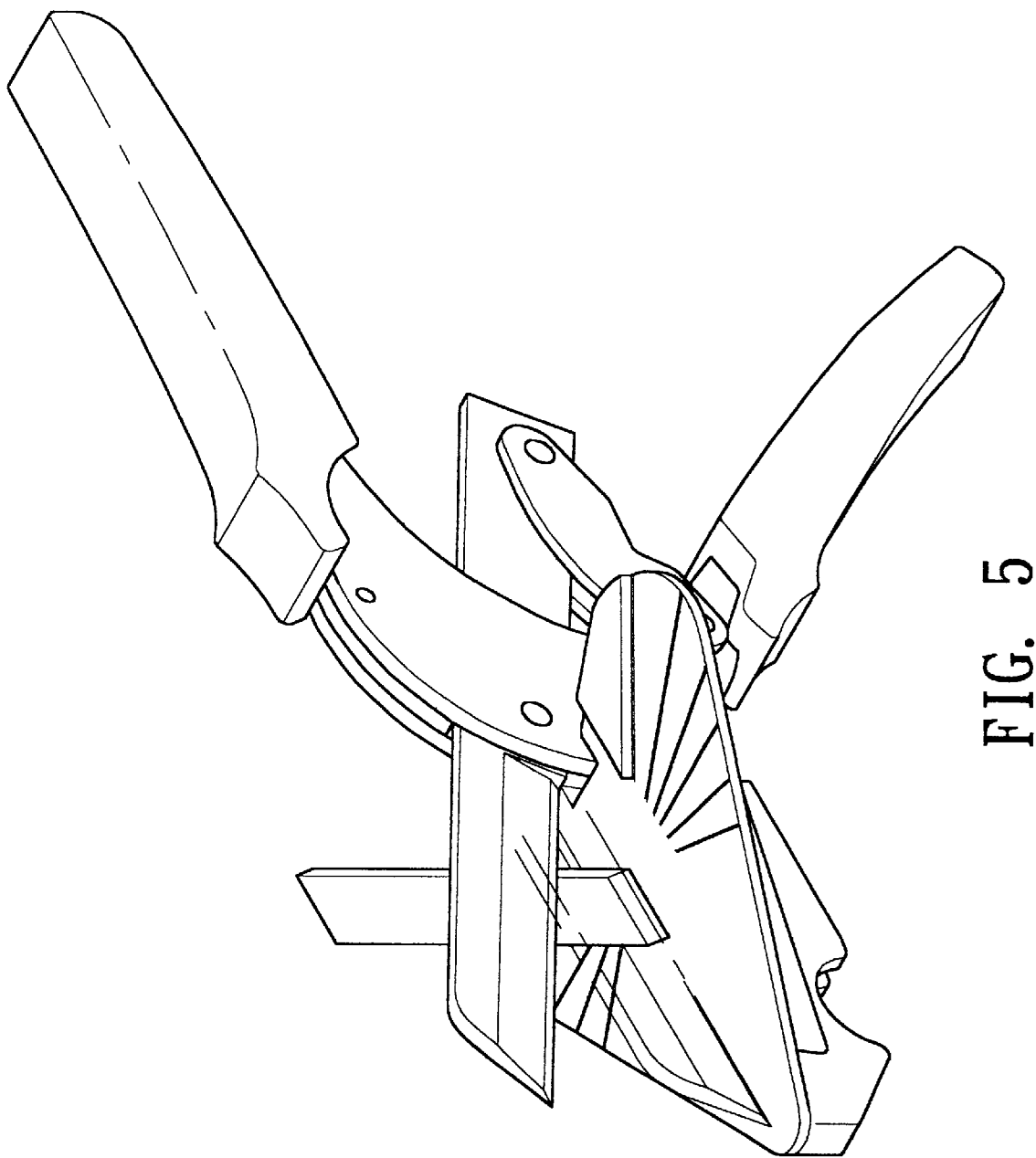
FIG. 5 shows the use of the present invention in another state.

A tubular work piece can be supported in the notches 54 of two sides of the blade channel 53 of the main body 5 without rolling. Then a user can tightly hold the first and second grips 1, 2 to scissor the tubular work piece with the blade section 31 as shown in FIG. 4. When cutting a board-like work piece, the fixing pin 13 is first pulled out for taking out the main body 5. The main body 5 is turned upside down with the cutting board 55 facing upward. Then the receiving cavity 51 is fitted with the clamp section 11. Then the fixing pin 13 is passed through the fixing hole 12 of the clamp section 11 and the through hole 52 of the blade sheath 5 for fixing the main body 5. The cutting board 55 is marked with angle scales 56, whereby the work piece can be cut by a certain angle in accordance with the angle scales 56. The work piece can be leant against the projecting section 57 of the rear edge of the angle scales 56 as shown in FIG. 5.

Two faces of the blade sheath unit main body 5 are integrally formed with the first and second blade sheaths with different configurations. Therefore, in use of the present invention, it is unnecessary to respectively store and use the different types of blade sheaths as the conventional multi-use scissors. As a result, the inconvenience in use of the multi-use scissors is eliminated and the blade sheaths are not subject to missing. Moreover, the replacement of the blade sheaths can be performed quickly.

Figure 6:
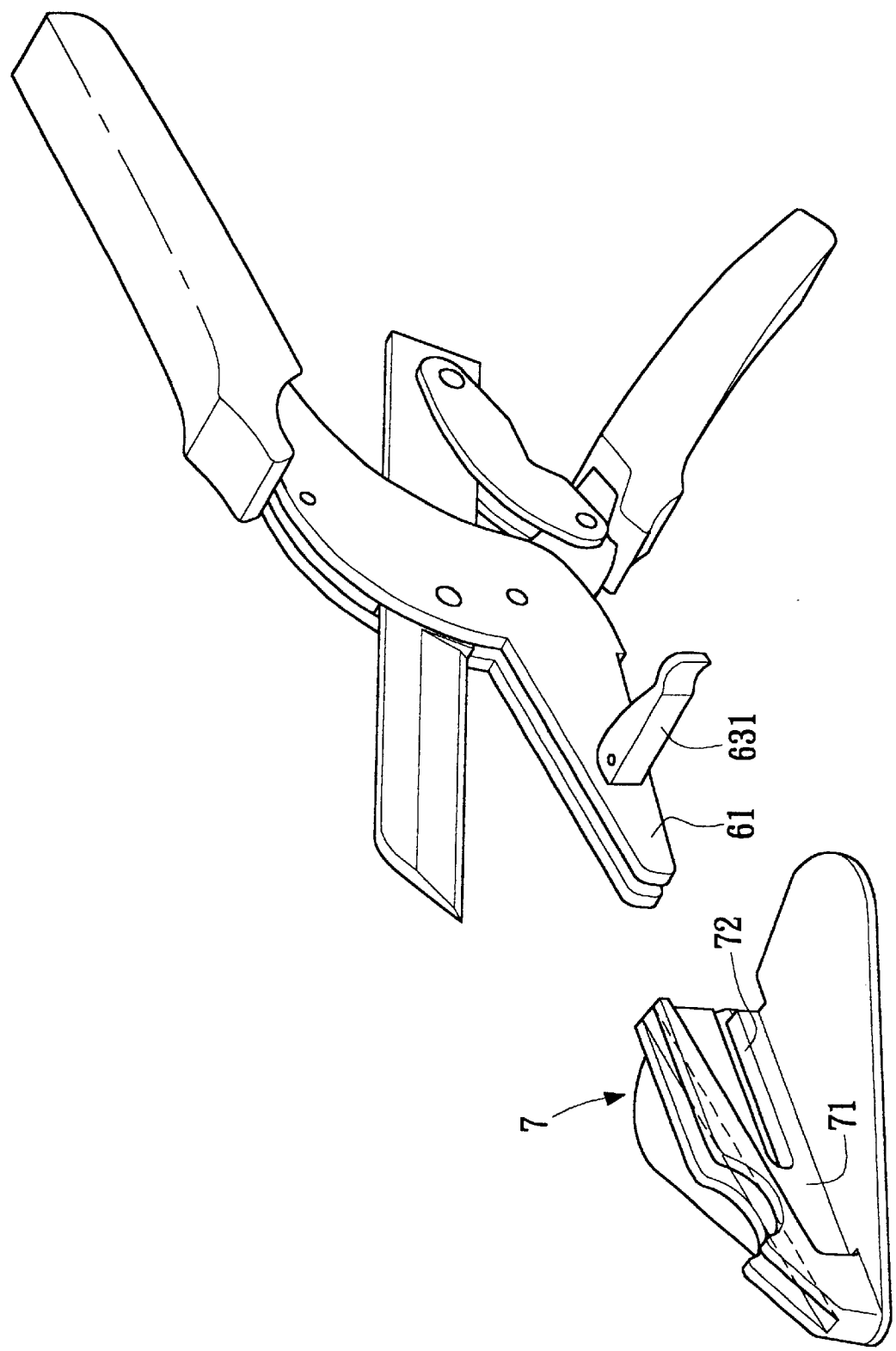
FIG. 6 shows a second embodiment of the present invention.
Figure 7:
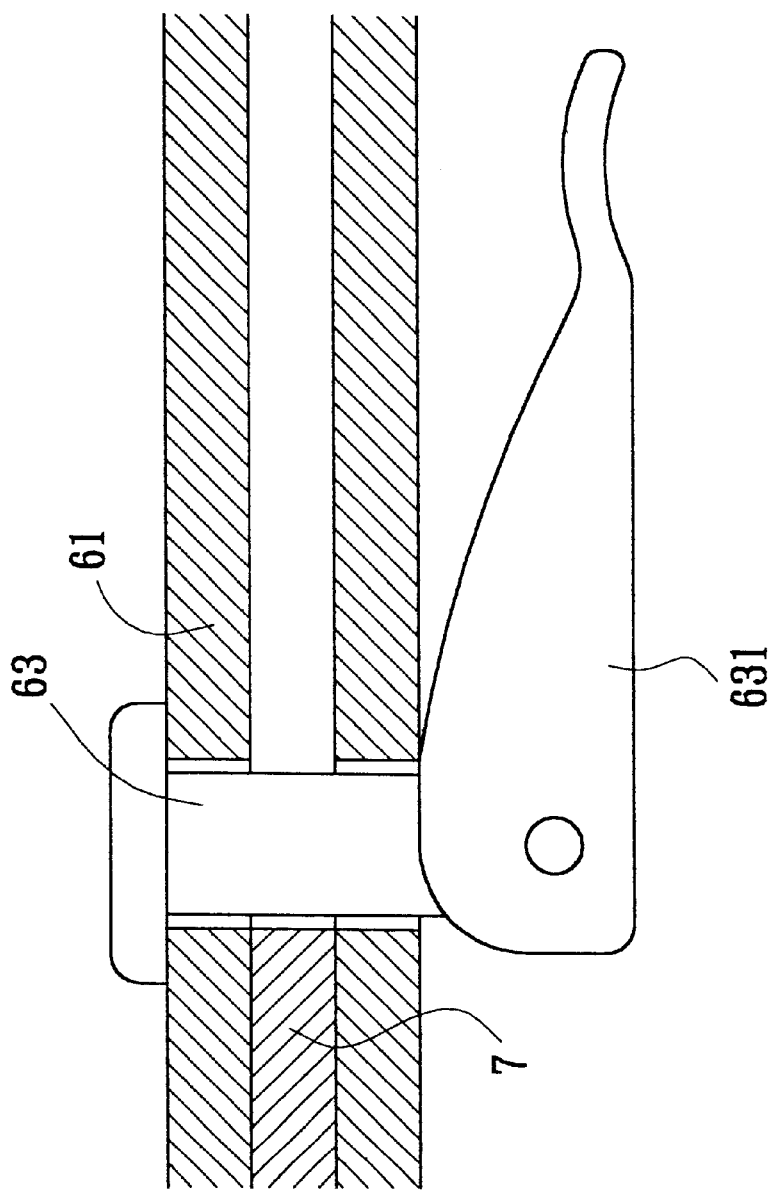
FIG. 7 is a sectional view of a part of the second embodiment of the present invention.
Figure 8:
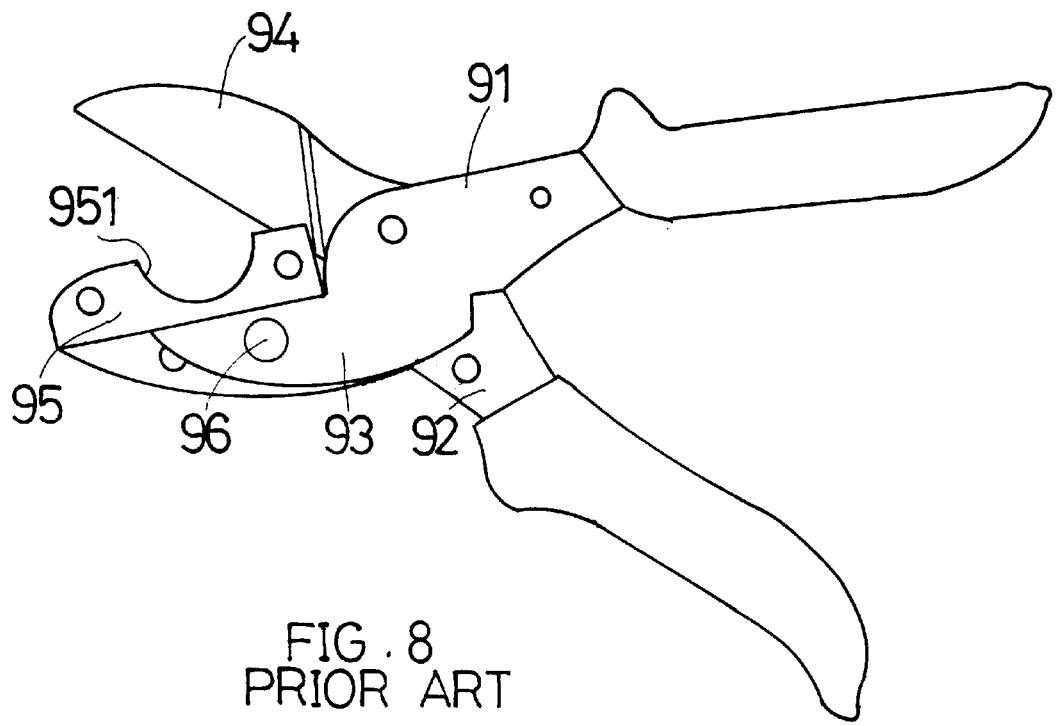
FIG. 8 shows the use of a conventional multi-use scissors in one state.
Figure 9:
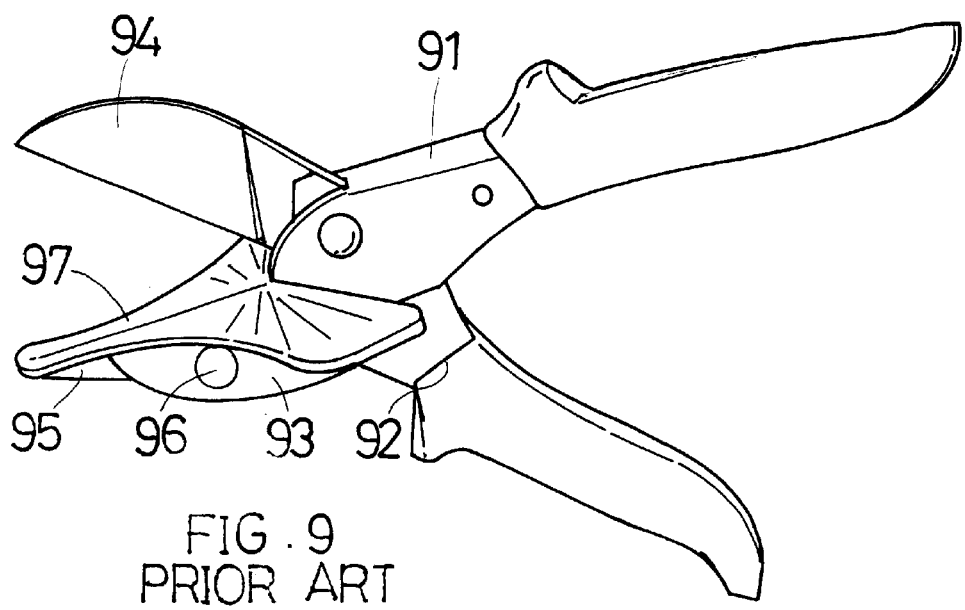
FIG. 9 shows the use of a conventional multi-use scissors in another state.

FIGS. 6 and 7 show a second embodiment of the present invention, in which the receiving cavity 71 of the blade sheath unit main body 7 is formed with an open slot 72 corresponding to the fixing pin 63 of the clamp section 61. Accordingly, the main body 7 can be directly fitted with the clamp section 61. The fixing pin 63 has an eccentric press lever 631. When pressed down, the eccentric press lever 631 can press and fix the main body 7 to achieve the same effect as the above embodiment.

The above embodiments are only used to illustrate the present invention, not intended to limit the scope thereof. Many modifications of the above embodiments can be made without departing from the spirit of the present invention.

What is claimed is:

1. A multi-use scissors comprising:

a first grip having a forward extending hollow clamp section at a front end thereof, a middle portion of the clamp section being formed with a fixing hole for a fixing pin to insert therein;

a second grip, a front end of the second grip being pivotally connected to the middle portion of the first grip;

a blade bar, a middle section of the blade bar being pivotally coupled to the middle portion of the first grip between the first and second grips, a front section of the blade bar being a blade section, a rear end of the blade bar being pivotally connected with one end of a link, an opposing end of the link being pivotally coupled to the second grip near the pivotal connection between the second grip and the first grip, a distance between the pivotal coupling between the blade bar and the first grip and the pivotal connection between the blade bar and the link being larger than a distance between the pivotal connection between the second grip and the first grip and the pivotal coupling between the second grip with the link; and a blade sheath unit having a main body, two sides of a middle section of the main body being respectively formed with two receiving cavities complementary to the clamp section for the clamp section to fit therein, the main body being formed with a through hole corresponding to the fixing hole of the clamp section for the fixing pin to pass therethrough, a top face and a bottom face of the main body being respectively formed with a first blade sheath and a second blade sheath, the first and second blade sheaths being respectively formed with two shoulder sections on a top edge and a bottom edge of the receiving cavities for the clamp section to lean against.

2. The multi-use scissors as claimed in claim 1, wherein a center of the first blade sheath is formed with a longitudinally extending blade channel for receiving the blade section of the blade bar therein, two sides of the blade channel being respectively formed with two transverse notches.

3. The multi-use scissors as claimed in claim 2, wherein the notches of the first sheath are arch-shaped.

4. The multi-use scissors as claimed in claim 1, wherein the second blade sheath includes a horizontal cutting board, two sides of the cutting board being marked with angle scales.

5. The multi-use scissors as claimed in claim 4 wherein a rear edge of the angle scales has a projecting section against which a work piece to be scissored is leaned.

* * * * *